United States Patent [19]

Lewis, Jr.

[11] Patent Number: 4,511,922

[45] Date of Patent: Apr. 16, 1985

[54] DIGITAL TELEVISION SYSTEM WITH TRUNCATION ERROR CORRECTION

[75] Inventor: Henry G. Lewis, Jr., Hamilton Square, N.J.

[73] Assignee: RCA Corporation, Princeton, N.J.

[21] Appl. No.: 435,777

[22] Filed: Oct. 21, 1982

[51] Int. Cl.³ .............................................. H04N 5/14
[52] U.S. Cl. ...................................... 358/166; 358/37
[58] Field of Search ....................... 358/13, 37, 39, 40, 358/160, 162, 166, 168, 169, 27; 364/737, 745, 724; 375/26

[56] References Cited

U.S. PATENT DOCUMENTS

| | | | |
|---|---|---|---|
| 4,124,869 | 11/1978 | Heitmann | 358/171 |
| 4,215,415 | 7/1980 | Kanemasa et al. | 364/745 |
| 4,270,139 | 5/1981 | Flamm et al. | 358/23 |
| 4,276,649 | 6/1981 | Groenendaal et al. | 371/55 |
| 4,340,940 | 7/1982 | Williams | 364/745 |
| 4,356,507 | 10/1982 | Goldberg et al. | 358/13 |
| 4,430,721 | 2/1984 | Acampora | 364/724 |

FOREIGN PATENT DOCUMENTS 1599157 9/1981 United Kingdom .

OTHER PUBLICATIONS

Proceedings of the IEEE, vol. 63, pp. 633–648, Apr. 1975, "Special-Purpose Hardware for Digital Filtering," by Stanley L. Freeny.

Primary Examiner—John C. Martin
Assistant Examiner—Michael D. Parker
Attorney, Agent, or Firm—Eugene M. Whitacre; Paul J. Rasmussen; Joseph J. Laks

[57] ABSTRACT

In a digital television signal processing system, first digital samples containing picture information are supplied to a digital processor. The processor operates on the samples to derive second samples that contain picture information modified from the original picture information. The digital processor includes within it processing chain a stage that produces an output digital word that is subject to truncation error when the processor is supplied with selected ones of the first digital samples. The truncation error results in the derivation of second digital samples that contain erroneously modified picture information. The truncation error is detected, and the values of the second digital samples are changed to different ones that contain picture information corrected for the effects of the truncation error.

5 Claims, 5 Drawing Figures $$\delta Y(n) = C_{n-2} Y_d(n-2) + C_{n-1} Y_d(n-1) + C_n Y_d(n) + C_{n+1} Y_d(n+1) + C_{n+2} Y_d(n+2)$$

DIGITAL TELEVISION SYSTEM WITH TRUNCATION ERROR CORRECTION

This invention relates to truncation error correction in a digital television signal processing system.

In digital television receivers, an analog baseband video signal is sampled and the samples converted to representative digital ones by an analog-to-digital converter. The digital samples are processed in a digital comb filter to produce samples representing separated luminance and chrominance information. The digital luminance and chrominance information containing samples are then processed in respective channels of a digital signal processing section. The digital signal processing section performs functions similar to those performed by the counterpart analog luminance and chrominance channels found in a conventional television receiver. Digital-to-analog converters convert the digital samples produced by the luminance and chrominance channels to analog signals representing the color picture that is to be displayed.

The digital samples produced within the digital signal processor of the television receiver may be n-bit digital words representing the quantized values of corresponding analog signals. The digital word may be in binary notation or in offset two's complement notation. When these words are operated upon by various stages in a processing chain there may result at a certain point within that chain a resultant digital word that has become truncated. An erroneous truncation produces a resultant digital word that contains erroneous picture information.

A feature of the invention is the detection of truncation error and the modification of the resultant digital word to one that is corrected for the effects of such error. As a specific example, assume a given adder in some processing stage sums two digital words, each having a value near its upper limit quantization level. The sum of these two words exceeds the dynamic range of the system. What results is a digital word truncated at the most significant bit location. The effect of the truncation is to produce a digital word that has a value that is substantially different than the true resultant value. To correct for such truncation error, upon its detection, the resultant digital word is changed to one at the upper limit quantization level, a value much closer to the true value of the summation.

Figure 1:
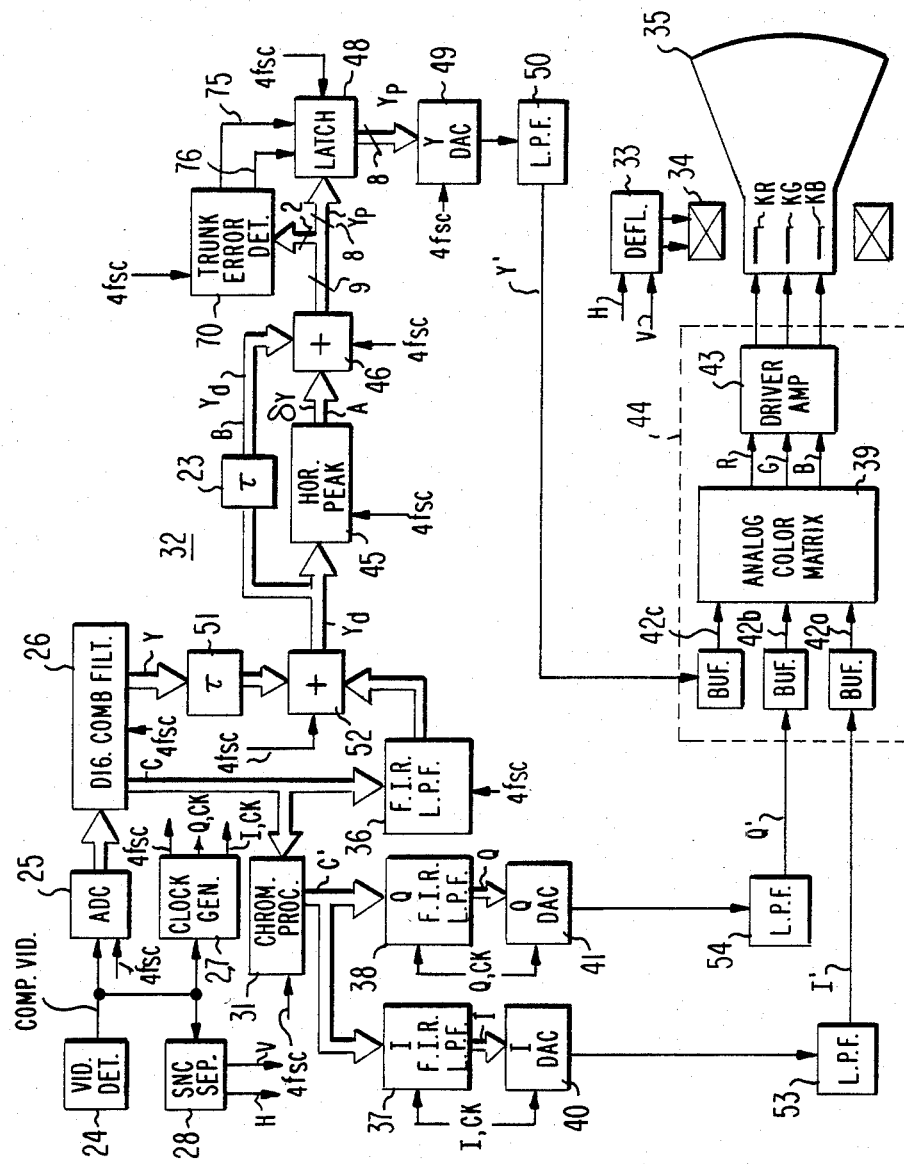
FIG. 1 illustrates a digital television processing system with truncation error correction embodying the invention.

In the digital television system of FIG. 1, a conventional video detector 24 develops an analog composite video signal. The composite video signal is applied to an input of an analog-to-digital converter, ADC 25. ADC 25 samples the video signal at a rate equal to four times the color subcarrier frequency, $4f_{sc}$, to produce digital samples of the video signal. Each digital sample may comprise, for example, an 8-bit word. The analog video signal will therefore be quantized to one of 256 discrete levels. The $4f_{sc}$ sampling clock signal for ADC 25 is developed by a clock generator 27 to enable the ADC to sample the analog video signal substantially synchronized with the color burst signal contained within the composite video signal.

A sync separator 28 is responsive to the video signal provided by video detector 24 and generates horizontal and vertical sync pulses that are applied to a deflection unit 33 along signal lines H and V, respectively. Deflection unit 33 generates horizontal and vertical deflection signals for deflection windings 34 of a color picture tube 35.

The digitized video signal produced by ADC 25 is applied to an input of a digital comb filter 26 that is clocked at $4f_{sc}$. Comb filter 26 produces a separated digital luminance signal Y that is applied along a data line to a luminance signal processor 32. Luminance processor 32 takes the digitized luminance signal Y and processes it, in a manner hereafter to be described, to produce a processed digital luminance signal $Y_P$ that is applied to the inputs of a digital-to-analog converter (DAC 49). The luminance signal at the output of DAC 49, now in analog form, is filtered by a lowpass filter 50 to remove sampling frequency components and to develop an analog luminance signal Y' that is applied to an input of a picture tube driver stage 44.

Comb filter 26 also produces a separated digital chrominance signal C that is applied to an input of a chrominance processor 31, clocked at the $4f_{sc}$ rate. Chrominance processor 31 may include a chrominance amplifier, not illustrated in FIG. 1, that amplifies the chrominance signal in response to viewer controlled color saturation control signals. Processor 32 may also include a chroma digital peaker, not illustrated in FIG. 1, that modifies the response characteristics exhibited by the chrominance signal to compensate for any undesirable response characteristics of the intermediate frequency circuitry preceding video detector 24.

The processed digital chrominance signal C' is then applied to an I finite impulse response lowpass filter FIR 37, and a Q finite impulse response lowpass filter, FIR 38. The I·FIR 37 is clocked at an $f_{sc}$ rate by an I-clock signal obtained from clock generator 27. Clock generator 27 provides the I-clock signal in sychronism with the occurrence of the I-axis phase points of the color burst reference signal contained within the composite video signal. The Q FIR 38 is clocked at an $f_{sc}$ rate by a Q-clock signal obtained from clock generator 27. Clock generator 27 provides Q-clock signals in synchronism with the occurrence of the Q axis phase points of the color burst reference signal contained within the composite video signal.

By being clocked at the synchronized I and Q clock rates, FIR 37 and FIR 38 inherently perform the function of synchronously demodulating the chrominance signal C' into its digital I and Q signal components, while at the same time performing their lowpass filtering functions. The I filter 37 has a passband extending from 0 to approximately 1.5 megahertz, and the Q filter 38 has a passband extending from 0 to 0.5 megahertz. The I and Q filters remove high frequency noise that may be contained in the color signals.

The filtered digital I and Q signals are converted to analog signals by digital-to-analog converters, DAC 40 and DAC 41, respectively. The analog signals are then filtered by lowpass filters 53 and 54 to remove sampling frequency components. The resultant I' and Q' signals are applied to respective inputs of driver stage 44.

Driver stage 44 includes an analog color matrix 39 of conventional design to which the analog I', Q', Y' signals are applied through respective buffers 42a-42c to develop the conventional R, G, B, signals. The R, G, B, signals are amplified by driver amplifier 43 and coupled to the cathode electrodes KR, KG, KB of picture tube 35 to produce a display of the color picture information contained in the composite video signal.

The processing chain that develops the analog luminance signal Y' from the digital luminance signal Y will now be described. To recover additional vertical detail of the picture information contained in the composite video signal, the digital chrominance signal C is applied to an FIR lowpass filter 36. The digital vertical information containing signals at the output of lowpass filter 36 is summed in an adder 52 with the digital luminance signal Y to obtain the processed luminance signal $Y_d$ that contains a substantial amount of vertical detail information. FIR lowpass filter 36 may have many elements in common with the bandpass FIR filter of chrominance processor 31.

The unprocessed luminance signal Y is first delayed by a delay circuit 51 prior to being applied to adder 52. The digital delay circuit 51 may be of conventional design, such as a string of shift registers interposed between each bit line of the Y digital word and the corresponding bit line of adder 52. Delay stage 51 may be used to correct for the impulse delay of the vertical detail information produced by FIR lowpass filter 36.

The processed digital luminance signal $Y_d$ is applied to a digital horizontal peaking processing stage 45. Horizontal peaking stage 45 responds to sharp transitions in the luminance information containing signal to produce a digital peaking signal $\delta Y$ on a word line A. The peaking signal $\delta Y$ is summed in an adder 46 with the original processed luminance signal $Y_d$ developed, after being suitably delayed by a stage 23, on a word line B. The resultant digital output signal $Y_p$ represents the peaked luminance information that provides contrast enhancement at vertical edges of the displayed picture. The peaked luminance signal $Y_p$ is applied to a latch 48 that, under normal circumstances, passes the signal through to digital-to-analog converter DAC 49 to convert the signal into the analog domain.

Figure 2:
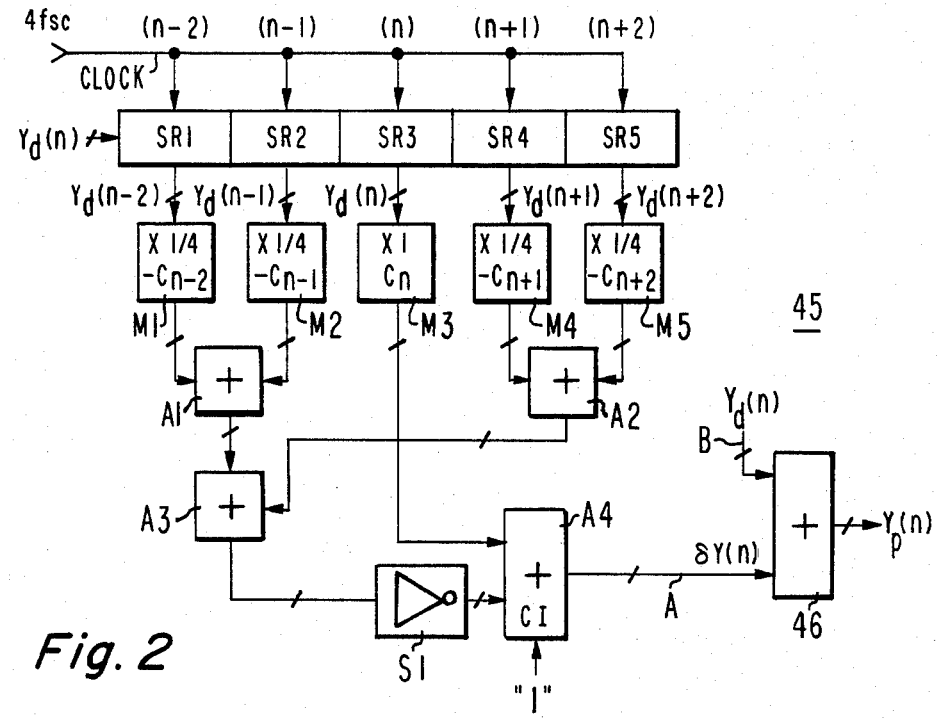
FIG. 2 illustrates a specific embodiment of the horizontal peaking stage of FIG. 1 that is subject to truncation error.

FIG. 2 illustrates a specific embodiment of the horizontal peaking processing stage 45 of FIG. 1. Horizontal peaking stage 45 of FIG. 2 is designed in the form of an FIR filter. The processed luminance signal with vertical detail information, $Y_d$, is applied to the first of a cascade of series-connected, plural bit, shift register stages SR1-SR5. The cascaded shift registers form the delay elements of the FIR filter. The $4f_{sc}$ clock signal is coupled to the clock input of each stage SR1-SR5. In response to each clock pulse, the digital sample of the luminance signal $Y_d(n)$ is loaded into the first stage SR1 and the digital samples already stored in the stages, including the first stage, are shifted to the next respective stage. In this manner, the samples corresponding to the respective clock signals, n, are separated, with the digital sample $Y_d(n)$ being stored in shift register SR3 at any given instant $t_n$ corresponding to the nth clock pulse.

To obtain the peaking signal $\delta Y(n)$ from the succession of digital luminance samples $Y_d(n)$. The magnitudes of the delayed samples are multiplied by fractional coefficients $c_n$ in accordance with the following equation:

$$\delta Y(n) = c_{n-2} Y_d(n-2) + c_{n-1} Y_d(n-1) + c_n Y_d(n) + c_{n+1} Y_d(n+1) + c_{n+2} Y_d(n+2).$$

As illustrated in FIG. 2, as the digital samples are shifted through the cascade of shift registers SR1-SR5, delayed samples $Y_d(n-2)$ through $Y_d(n+2)$ are produced at the respective outputs of the stages. The outputs of shift registers SR1-SR5 are applied to multiplier stages M1-M5 which multiply the respective delayed samples by the magnitudes of the respective coefficients $c_{n-2}$ through $c_{n+2}$. Multipliers M1-M5 may be implemented by the well-known technique of hardwire shifting the digital words by the appropriate number of bits to the right before they are summed in a standard adder tree.

To derive the digital peaking signal, $\delta Y(n)$, in accordance with the above recited equation, the delayed and coefficient weighted digital samples at the outputs of multipliers M1-M5 are summed in the manner illustrated in FIG. 2 by an adder tree comprising adders A1-A4. The peaking signal $\delta Y(n)$ is obtained at the output of the last adder A4 of the adder tree.

For illustrative purposes, FIG. 2 shows a shift register arrangement for horizontal peaking stage 45 that has only 5 stages or taps. A greater number of taps may be used if it is desired to change the width or waveshape of the preshoots and overshoots of the resulting peaked luminance signal. Similarly, for illustrative purposes only, the coefficients are selected as follows:

$$c_{n-2} = -\tfrac{1}{4};\ c_{n-1} = -\tfrac{1}{4};\ c_n = +1;\ c_{n+1} = -\tfrac{1}{4};\ c_{n+2} = -\tfrac{1}{4}.$$

Because multipliers M1-M5 are scaler multipliers, whereas the coefficients, other than the center-tap coefficient $c_n$, are negative, scaler addition is performed in the adder tree until the output of adder A3 is obtained. The output of adder A3 is then subtracted from the output of multiplier M3 to obtain the luminance peaking signal Y(n). The two's complement subtraction is performed by applying the output of adder A3 to a conventional one's complement transform element S1, and then applying the output of S1 to adder A4 at the same time that a logical "1" is applied to the carry-in terminal CI of the adder.

To obtain the peaked luminance signal $Y_p(n)$, the output of adder A4 is summed with the delayed luminance signal $Y_d(n)$ in adder 46.

Figure 4:
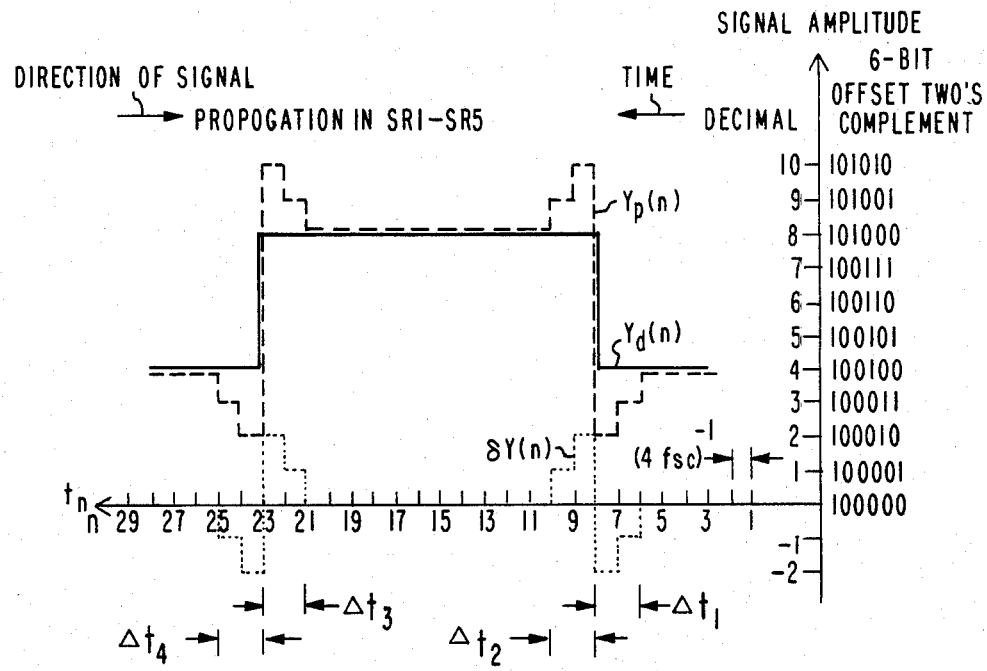
FIGS. 4 and 5 illustrate waveforms useful in explaining operation of the system of FIG. 1.

FIG. 4 illustrates waveforms useful in explaining operation of horizontal peaking processing stage 45. Assume, for example, that the luminance signal $Y_d(n)$, solid-line waveform, is a rectangular pulse waveform of duration equal to 15 clock pulses. The signal exceeds the base amplitude of zero units by 4 units. The signal amplitude scale of FIG. 4 is shown both in decimal notation and in offset two's complement notation. The word length for each signal sample is chosen as six bits to simplify the explanation, whereas eight or nine bits may typically be used in actual practice.

At clock pulse 8 the luminance signal $Y_d(n)$ undergoes a sharp positive going transition. Horizontal peaking stage 45 of FIG. 2 responds to this sharp transition and produces at its output on word line A during the intervals $\Delta t_1$ and $\Delta t_2$ the peaking signal $\delta Y(n)$, illustrated in FIG. 4 as the dotted-line waveform from clock pulse 6 to clock pulse 10.

At clock pulse 23, the luminance signal $Y_d(n)$ undergoes a sharp negative going transition. Horizontal peaking stage 45 responds to this sharp transition and produces at its output word line A during the intervals $\Delta t_3$ and $\Delta t_4$ the peaking signal $\Delta Y(n)$, as illustrated in FIG. 4 from clock pulse 21 to clock pulse 25.

The peaked luminance signal $Y_p(n)$ developed at the output of adder 46 is illustrated in FIG. 4 as the dashed-line waveform and equals the sum of the solid-line waveform and the dotted-line waveform.

Figure 5:
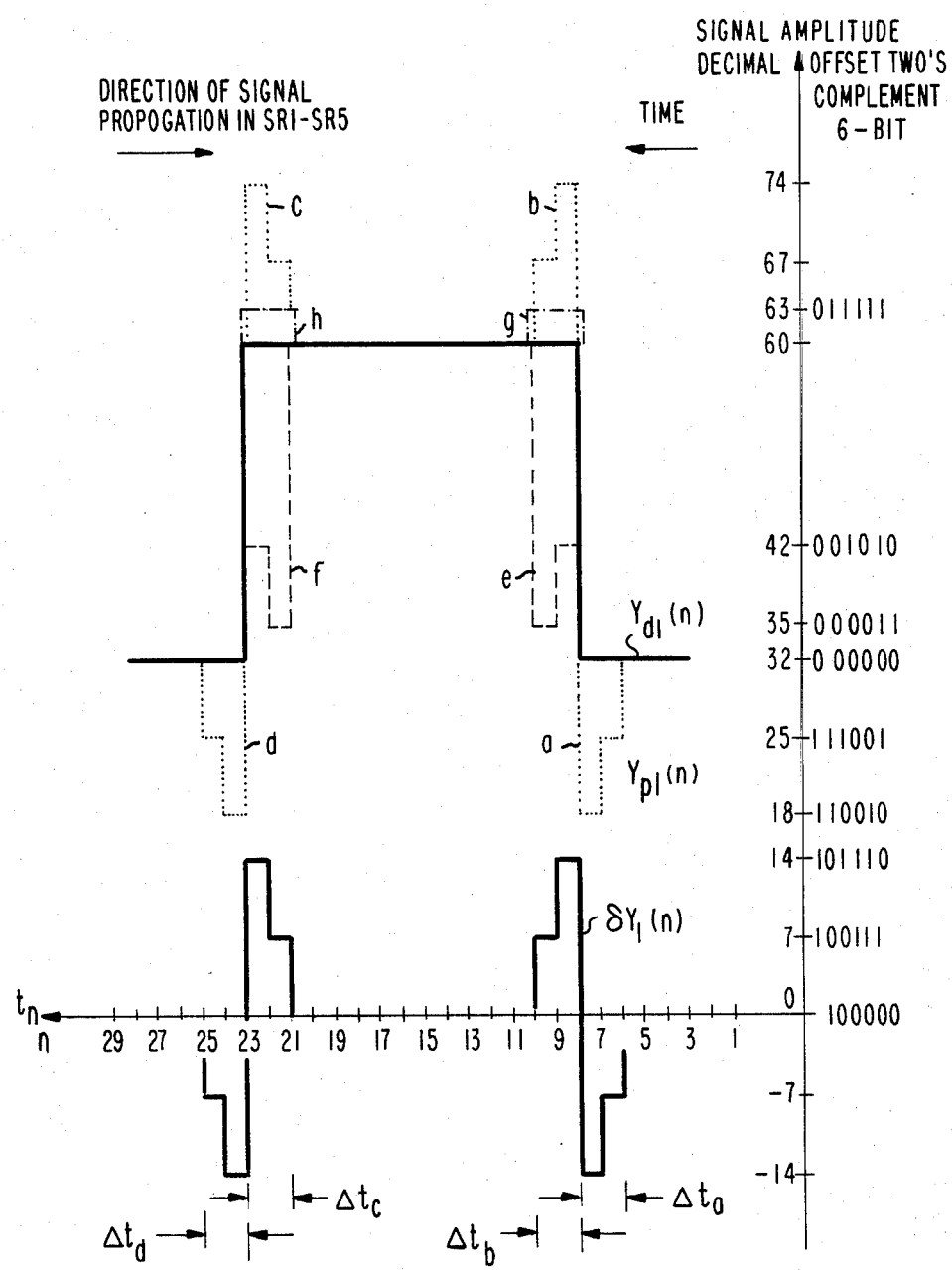

Under certain signal conditions, horizontal peaking processing stage 45 of luminance processor 32 may be susceptible of truncation error to produce an output digital word $Y_p(n)$ at the output of adder 46 that contains erroneously modified or processed luminance picture information. For example, assume an input luminance signal $Y_{d1}(n)$ illustrated by the upper solid-line waveform of FIG. 5. The luminance signal $Y_{d1}(n)$ between clock pulse 8 and clock pulse 23 is at the decimal equivalent level of 60 units, a level near the upper limit quantization level of 63 in a six bit word processing system, for example. As illustrated in FIG. 5, using the filter response characteristics established by coefficient multipliers M1–M5 of FIG. 2, the peaking signal $\delta Y_1(n)$ from clock pulse 8 to clock pulse 9 and from clock pulse 22 to clock pulse 23 is of 14 units magnitude. The peaking signal from clock pulse 9 to clock pulse 10 and from clock pulse 21 to clock pulse 22 is of 7 units magnitude.

In the two intervals, interval $\Delta t_b$ and $\Delta t_c$, the peaked luminance signal should have an actual value greater than 63 units as indicated by dotted portions b and c of FIG. 5. However, because adder stage 46 in this example has a dynamic range of only six bits or 64 levels, the output digital word $Y_{p1}(n)$ of adder 46 is subject to a truncation error that results in an overflow condition. The overflow of adder 46 produces an erroneous output digital word $Y_{p1}(n)$ representing much smaller quantization levels. The dashed waveform portions e and f of FIG. 5 illustrate the erroneous digital samples of the peaked luminance signal $Y_{p1}(n)$ during the overflow condition.

Under different signal conditions, selected samples of the luminance signal $Y_{d1}(n)$ may produce an underflow condition in adder 46 where instead of erroneous output digital words being produced near the lower limit quantization levels, erroneous words are produced having higher quantization levels.

To correct for the effects of such truncation errors, the circuit of FIG. 1 embodying the invention includes a truncation error detection stage 70 which detects the occurrence of a truncation error by detecting either an overflow condition or an underflow condition as aforedescribed and provides to latch 48 an overflow error detecting signal along a signal line 75 or an underflow error detecting signal along a line 76.

Latch 48 responds to the presence of an error detecting signal along line 75 or 76 and modifies the signal $Y_p$ from adder 46 prior to passing the signal along to the Y digital-to-analog converter DAC 49. The modified digital word at the output of latch 48 is corrected for the effects of the truncation error so as to establish the output bits of the latch at the upper limit quantization level under an overflow condition and at the lower limit quantization level under an underflow condition.

Figure 3:
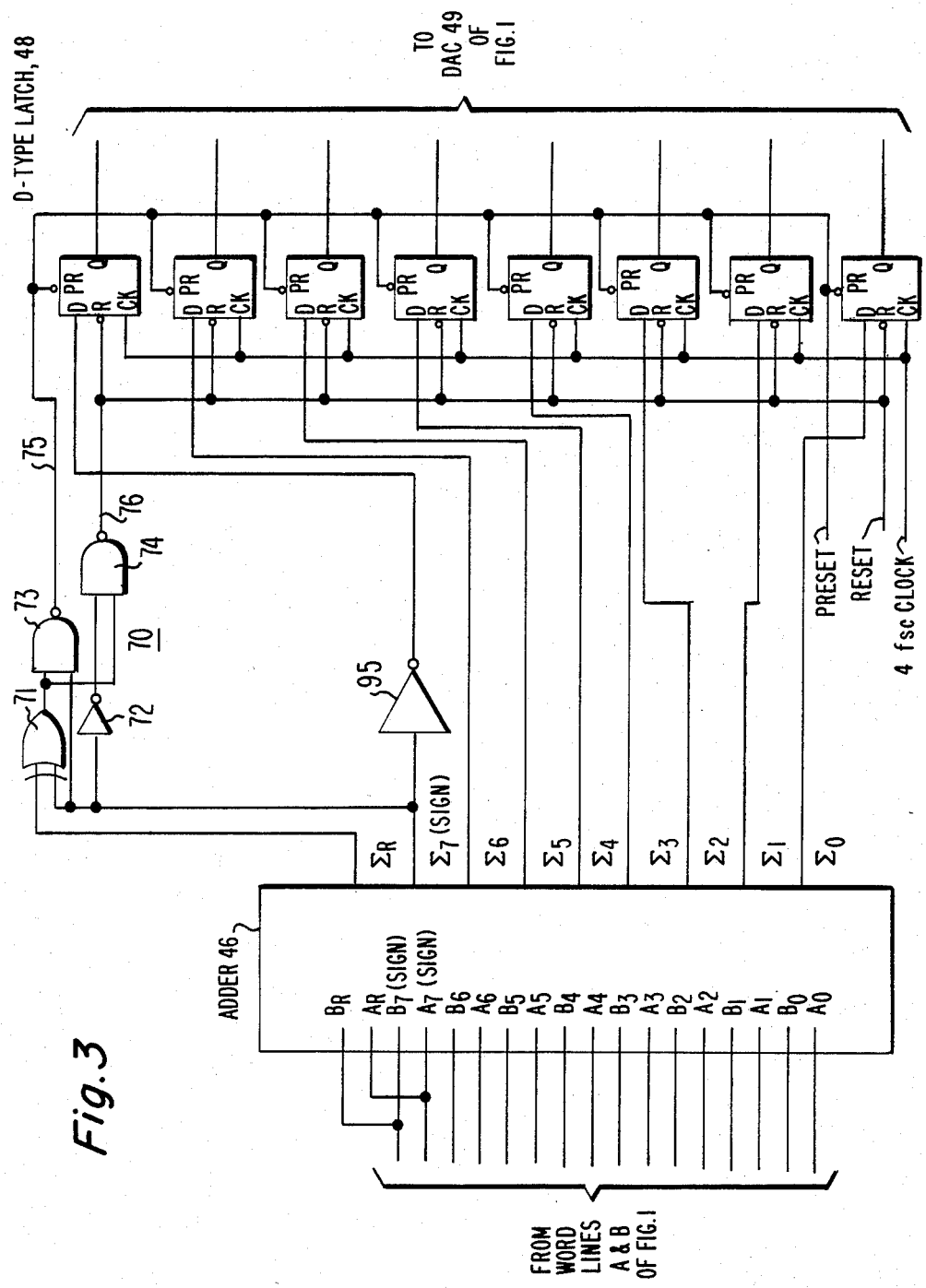
FIG. 3 illustrates a portion of the system of FIG. 1 including a specific embodiment of the truncation error detector and latch arrangement of FIG. 1.

FIG. 3 illustrates a specific embodiment of a portion of the system of FIG. 1 including adder 46, truncation error detector 70, and latch 48. Assume for illustrative purposes only, the digital words developed along signal lines A and B of FIG. 1 are 8-bit words in offset two's complement notation, with adder 46 performing summation in offset two's complement arithmetic. Further assume that DAC 49 is of conventional design requiring an 8-bit input word in binary notation. Furthermore adder 46 is chosen as a 9-bit adder capable of adding two 9-bit words, $A' = (A_0 - A_7, A_R)$ and $B' = (B_0 - B_7, B_R)$ to develop the 9-bit summed word $\Sigma' = (\Sigma_0 - \Sigma_7, \Sigma_R)$.

Illustrated in FIG. 3 are specific embodiments of adder 46, truncation error detector 70, and latch 48 of FIG. 1. Adder 46 receives along sixteen input signal lines, two 8-bit digital words, $A = (A_0 - A_7)$, and $B = (B_0 - B_7)$. Digital word A comprises the luminance peaking signal $\delta Y$ of FIG. 1 and digital word B comprises the processed liminance signal with vertical detail information $Y_d$. Adder 46 algebraicly sums the two words A and B to produce an 8-bit digital word $\Sigma = (\Sigma_0 - \Sigma_7)$. The digital word $\Sigma$ comprises the peaked luminance signal $Y_p$ that is applied to latch 48 of FIG. 1.

The arithmetic logic used in adder 46 may be illustratively, offset two's complement arithmetic wherein the most significant bit $A_7, B_7$ or $\Sigma_7$ represents the sign bit such that the 256 levels of quantization available when using an 8-bit word are achieved by going from $-128$, with a "1" at the most significant bit, to $+127$, with a "0" at the most significant sign bit.

Under an overflow condition, for example, similar to the condition previously described and illustrated in FIG. 5, the algebraic sum of the quantities A and B exceed the upper limit quantization level of $+127$. What would be desirable in many circumstances, is to provide a summed quantity $\Sigma$ that is close to the true algebraic sum of A and B, that is to say, to produce a quantity $\Sigma$ equal to the upper limit quantization level of $+127$.

Instead what does occur, due to the truncation error produced by adder 46 in its digital output word, is the production of a summed quantity that is of a substantially erroneous value. Under an overflow condition, for example, the sign bit $\Sigma_7$, changes, due to truncation error, from an "0" to a "1". The digital word $\Sigma$ now undesirably represents a smaller number rather than representing a number which is at the upper limit quantization level.

An analogous situation occurs when the truncation error is due to an underflow condition where the algebraic sum of the two quantities A and B equals a quantity more negative than the lower limit quantization level of $-128$.

If an overflow condition truncation error occurs in luminance processor 32, at adder 46, for example, the error, depending upon the type of picture information to be displayed, may be observed on the screen of picture tube 35 of FIG. 1, as a dark or lower brightness spot or region where in fact a relatively high brightness region should have been observed. If an underflow condition truncation error occurs, the error may be observed as a higher brightness region where in fact a relatively low brightness region should have been observed.

In accordance with the invention, the truncation error is detected and the digital word subject to such tuncation error is modified to one that corrects for the effects of such error. As illustrated in FIG. 3, adder 46 includes two additional input terminals $A_R$ and $B_R$. The input bits at these two terminals are summed to produce the summation signal bit $\Sigma_R$. Directly connected to the two terminals $A_R$ and $B_R$ are the signal lines that go to the $A_7$ and $B_7$, sign-input terminals of the 8-bit words A and B. Thus, the sign bits $A_7$, and $B_7$ are replicated as the bits $A_R$ and $B_R$, respectively.

Adder 46 algebraically sums the two 9-bit words $A' = (A_0-A_7,A_R)$ and $B' = (B_0-B_7,B_R)$ to obtain the 9-bit digital word $\Sigma' = (\Sigma_0-\Sigma_7,\Sigma_R)$ representing the summation of A and B in offset two's complement form, with replicated sign bit.

If the value of the summed word $\Sigma'$ is at or below the upper limit quantization level of +127 but not lower than the lower limit quantization level of −128 no truncation error occurs and the sign bit $\Sigma_7$ and the next high order bit $\Sigma_R$ are in the same logical state, either both in the logical "0" state or both in the logical "1" state. If an overflow condition occurs, where the value of the sum of A and B is greater than +127, a truncation error is indicated when the $\Sigma_7$ bit is a logical "1" and the $\Sigma_R$ bit is a logical "0". If an underflow condition occurs, where the value of the sum of A and B is less than −128, a truncation error is indicated when the $\Sigma_7$ bit is a logical "0" and the $\Sigma_R$ bit is a logical "1".

To detect such truncation error and to determine whether or not the error is due to an underflow or an overflow condition, logic network 70 of FIG. 3 is provided. Logic network 70 comprises and XOR gate 71, an inverter 72 and two NAND gates 73 and 74. The $\Sigma_7$ bit of the summed digital word $\Sigma'$ is applied to an input terminal of XOR gate 71 and to the input of inverter 72. The $\Sigma_R$ bit is applied to the other input terminal of XOR gate 71. The output of NAND gate 73 is coupled to a PRESET line of FIG. 3. The output terminal of NAND gate 74 is coupled to a RESET line.

The RESET line is coupled to the RESET terminals R of eight D-type flip flops that comprise latch 48. The PRESET line is coupled to the PRESET terminals, PR of the eight flip flops. A low or logical "0" input on the PRESET line of the eight D-type latches makes their Q output terminals go high or in the logical "1" state. A low or logical "0" input on the RESET line makes the Q output terminals go low or in the logical "0" state.

The first 8-bits, $\Sigma_0-\Sigma_7$, of the summed digital word $\Sigma'$, at the output of adder 46 represents, in offset two's complement arithmetic, the value of the sample of the peaked luminance signal $Y_p$. The Y digital-to-analog converter, DAC 49, of FIG. 1, reconstructs from the sequence of digital samples developed at the output of adder 46, the analog signal containing the peaked luminance information.

DAC 49, however, requires that the received digital word be in straight binary arithmetic form. To convert from offset two's complement notation to straight binary, the logical states of the sign bit, $\Sigma_7$, of FIG. 3, is changed by an inverter 95 before being applied to the D input terminal of the appropriate one of the eight D-type flip flops of latch 48. Thus, the eight Q outputs of latch 48 form the binary word representing the peaked luminance signal $Y_p$.

In a truncation error situation, logic network 70 of FIG. 3 determines whether or not an overflow or underflow condition exists and provides a control signal to either the RESET or PRESET line. All the Q outputs of the D-type flip flops are established as being either in the high or logical "1" state for an overflow condition or in the low or logical "0" state for an underflow condition.

In an overflow condition, the $\Sigma_7$ bit is erroneously a "1" and the $\Sigma_R$ bit is a "0". In this situation, the output of NAND gate 74 is high and the output of NAND Gate 73 is low. A PRESET control signal is thereby applied to the control terminals PR of flip flops 48, resulting in the Q outputs going high. With all the Q outputs high, the analog output signal, at the output of DAC 49 is at its maximum value, independent of the erroneous, truncated value taken up by the first eight bits of the digital word $\Sigma'$.

In an underflow condition the $\Sigma_7$ bit is in the low state, and the $\Sigma_R$ is in the high state, resulting in the output of NAND Gate 74 being low and the output of NAND Gate 73 being high. A RESET control signal is applied to control terminals R of flip flops 48, resulting in the Q output terminals being placed in the low state, as is desirable in order to develop a minimum value signal at the output of DAC 49 during an underflow condition.

It should be noted that the inventive concepts embodied in truncation error detector 70 and latch 48 may be employed, typically, at any point within the digital television signal processing chain that is subject to such error, such as at an intermediate or final adder stage of a finite impulse response filter such as I FIR 37 or Q FIR 38.

Furthermore, error detector 70 and latch 48 may be located at points within a processing chain that are separated from one another by intermediate processing stages. An expecially advantageous location for latch 48 under certain circumstances is immediately preceding the digital-to-analog converter where the latch may be employed in conjunction with truncation error detectors positioned at several intermediate locations. Still further, truncation error detector 70 may be redesigned to both PRESET and RESET, at the same time, selected ones of the 8 D-type flip flops of latch 48. Such an arrangement permits one to correct truncation errors by modifying the erroneous digital word to quantization levels other than the upper or lower limit quantization levels to better obtain picture fidelity.

Employing such schemes as just recited reduces the possibility of regions being displayed on the screen of the television receiver picture tube that have objectionable color or brightness fidelity and minimize the effects of such regions when they are being displayed.

What is claimed is:

1. A digital television signal processing system with truncation error, correction, comprising:
   means for supplying first digital samples containing picture information;
   a digital processor operating on said first digital samples to derive therefrom second digital samples that contain picture information that is modified from the picture information contained in said first digital samples, said digital processor including within its processing chain a processing stage that produces an output digital word that is subject to truncation error when said digital processor is supplied with selected ones of said first digital samples such that said truncation error results in the derivation of second digital samples containing erroneously modified picture information;
   means coupled to said digital processor for detecting the truncation error produced by said processing stage; and
   means coupled to said truncation error detecting means for changing said second digital samples upon the detection of said truncation error to different samples that contain picture information corrected for the effects of said truncation error, wherein said processing stage includes an adder that develops said output digital word such that said adder produces one of an overflow and underflow condition upon the occurrence of said truncation error and wherein said second digital sample changing means includes a latch that receives said output digital word and passes it to a subsequent processing stage such that upon the detection of said truncation error said latch passes a modified output digital word corrected for the effects of said truncation error.

2. A system according to claim 1 wherein said digital processor comprises the luminance processor of a color television signal processing system and wherein said processing stage comprises the stage that produces horizontal peaking of the luminance picture information to derive second digital samples containing peaked luminance picture information.

3. A system according to claim 1 wherein said first and second digital samples comprise digital words representing quantization levels of the amplitudes of first and second analog signals respectively that contain respectively the first referenced and modified picture information and wherein said processing stage is subject to truncation error that tends to result in the derivation of second digital samples that represent erroneous quantization levels.

4. A system according to claim 1 wherein the words summed by said adder are in offset two's complement form and said adder includes means for replicating the sign bit of each word to be summed to produce an extended word that when summed by said adder results in an adder output word that is also an extended word such that, upon the occurrence of either an overflow or an underflow condition, the sign bit and the next higher bit of the extended adder output word are in different states.

5. A system according to claim 4 wherein said truncation error detecting means is responsive to the states of the sign bit and next higher bit to provide a first error detecting signal upon the detection of an overflow condition and a second error detecting signal upon the detection of an underflow condition and wherein said latch is responsive to the two error detecting signals to establish the bits of the latch output word in a first predetermined state in response to said first error detecting signal and in a different predetermined state in response to said second error detecting signal.

* * * * *